US009829587B2

(12) United States Patent
Iijima et al.

(10) Patent No.: US 9,829,587 B2
(45) Date of Patent: Nov. 28, 2017

(54) RADIOGRAPHING SYSTEM, CONTROL APPARATUS, RADIATION IMAGING APPARATUS, AND METHOD FOR CONTROLLING RADIOGRAPHING SYSTEM

(71) Applicant: CANON KABUSHIKI KAISHA, Tokyo (JP)

(72) Inventors: Tadahiko Iijima, Yokohama (JP); Hirokazu Ohguri, Funabashi (JP); Shinji Yamanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/290,813

(22) Filed: Oct. 11, 2016

(65) Prior Publication Data

US 2017/0108595 A1   Apr. 20, 2017

(30) Foreign Application Priority Data

Oct. 14, 2015   (JP) .................................. 2015-203139

(51) Int. Cl.
*G01T 1/24* (2006.01)
*H04N 5/32* (2006.01)

(52) U.S. Cl.
CPC .............. *G01T 1/244* (2013.01); *H04N 5/32* (2013.01)

(58) Field of Classification Search
CPC .................................. G01T 1/244; H04N 5/32
See application file for complete search history.

(56) References Cited

U.S. PATENT DOCUMENTS

| | | | |
|---|---|---|---|
| 2005/0070792 A1* | 3/2005 | Mizukoshi ............. | A61B 6/032 600/427 |
| 2014/0241503 A1* | 8/2014 | Yonekawa ........... | A61B 6/4233 378/62 |
| 2016/0061970 A1* | 3/2016 | Asai ........................ | G01T 1/175 702/182 |
| 2016/0278729 A1* | 9/2016 | Iijima .................. | A61B 6/4208 |

FOREIGN PATENT DOCUMENTS

JP           2015-6413 A       1/2015

* cited by examiner

*Primary Examiner* — Marcus Taningco
(74) *Attorney, Agent, or Firm* — Canon U.S.A., Inc. IP Division

(57) ABSTRACT

A radiographing system includes a plurality of radiation imaging apparatuses and a control apparatus. The control apparatus includes a memory, a processor, a shifting unit, a determining unit, and a disabling unit. The shifting unit shifts the radiation imaging apparatus into the radiographing enabled state in which radiation is detected and a radiographic image is generated. The determining unit determine whether to disable shifting the radiation imaging apparatus into the radiographing enabled state based on control for radiographing using a different radiation imaging apparatus currently in the radiographing enabled state. The disabling unit disables shifting the radiation imaging apparatus into the radiographing enabled state based on a determination result.

18 Claims, 11 Drawing Sheets

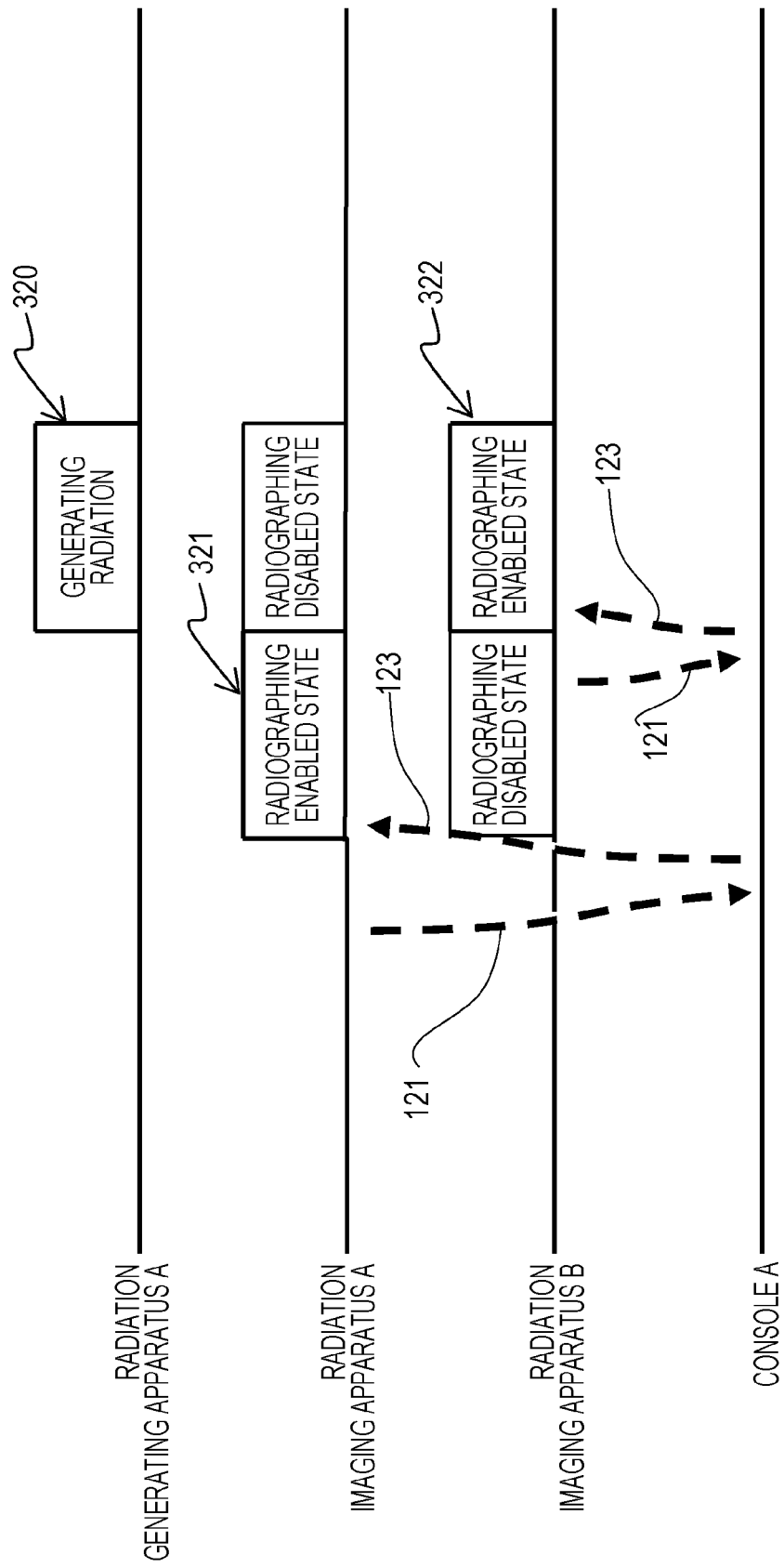

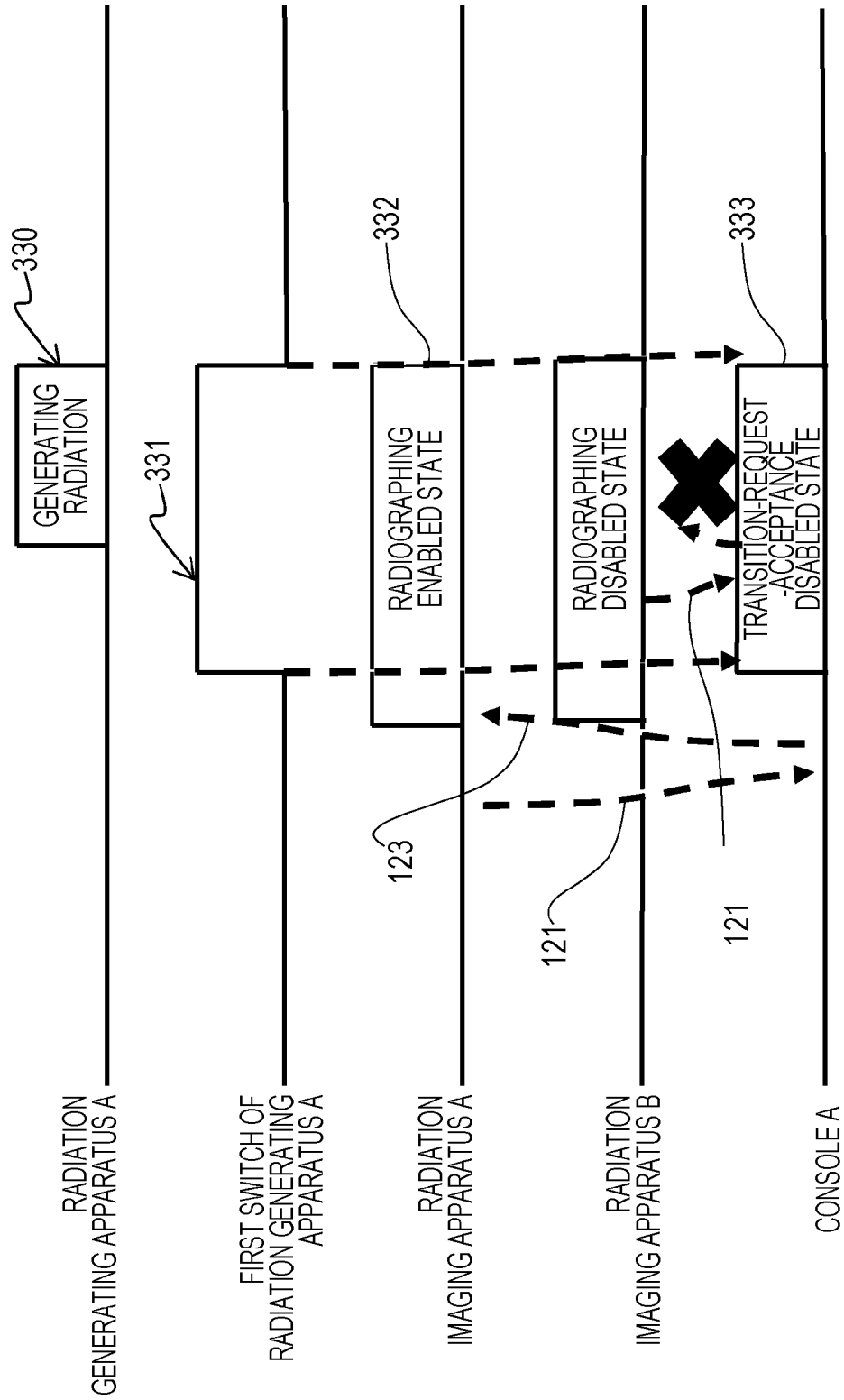

RADIOGRAPHING SYSTEM, CONTROL APPARATUS, RADIATION IMAGING APPARATUS, AND METHOD FOR CONTROLLING RADIOGRAPHING SYSTEM

BACKGROUND

Field

Aspects of the present invention generally relate to a radiographing system, a control apparatus, a radiation imaging apparatus, and a method for controlling the radiographing system.

Description of the Related Art

Known radiographing systems irradiate an object with radiation generated from a radiation generating apparatus, digitize a radiographic image based on the intensity distribution of the radiation passed through the object, and process the digitized image to generate a clear radiographic image using a radiation imaging apparatus. Radiation imaging apparatuses including a wireless communication function have been developed that transfer image data on the generated radiographic image to a control computer of the radiographing system to process and store the image data.

Radiation imaging apparatuses including the wireless communication function can be moved to a plurality of radiographing rooms for use. When the radiographing room for use is changed, settings on wireless communication and association with a control computer to be communicated with are made. If a plurality of radiation imaging apparatuses are associated with one control computer, a radiation imaging apparatus for use in radiographing is designated. Japanese Patent Laid-Open No. 2015-6413 proposes a method of radiographing for a case where a radiation imaging apparatus is moved to a different radiographing room. This method involves making settings for wireless communication and association with a control computer and designating a radiation imaging apparatus to be used in the next radiographing.

However, an issue with the method disclosed in Japanese Patent Laid-Open No. 2015-6413 is as follows. Suppose that immediately before an operator A takes a radiograph of an object using a control computer A and a radiation imaging apparatus A, an operator B presses a radiographing-enabled-state transition switch of a radiation imaging apparatus B associated with the control computer A without associating the radiation imaging apparatus B with a control computer B. The radiographing-enabled-state transition switch is a switch for shifting the radiation imaging apparatus into a radiographing enabled state.

In this case, the radiation imaging apparatus B operated by the operator B enters into the radiographing enabled state, and the radiation imaging apparatus A that the operator A is going to use for radiographing enters into a radiographing disabled state. If the operator A issues an instruction to apply radiation to the object without being aware of the radiographing disabled state, the object is irradiated with radiation, but the radiation imaging apparatus B forms an invalid image, and thus the object to be radiographed by the radiation imaging apparatus A is exposed to radiation without a valid image being obtained.

SUMMARY OF THE INVENTION

The present disclosure prevents a radiation imaging apparatus for use in radiographing from being changed after the radiation imaging apparatus is brought to a photographing enabled state.

A radiographing system according to an aspect of the present disclosure includes a plurality of radiation imaging apparatuses and a control apparatus. The plurality of radiation imaging apparatuses detect radiation and form a radiographic image. The control apparatus controls the plurality of radiation imaging apparatuses and includes a memory, a processor, a shifting unit, a determining unit, and a disabling unit. The shifting unit, in response to a transition request from a radiation imaging apparatus to shift the radiation imaging apparatus into a radiographing enabled state, shifts the radiation imaging apparatus into the radiographing enabled state in which radiation is detected and a radiographic image is generated. The determining unit determine whether to disable shifting the radiation imaging apparatus into the radiographing enabled state based on control for radiographing using a different radiation imaging apparatus currently in the radiographing enabled state. The disabling unit disables shifting the radiation imaging apparatus into the radiographing enabled state based on a determination result.

Further features of aspects of the present invention will become apparent from the following description of exemplary embodiments with reference to the attached drawings.

BRIEF DESCRIPTION OF THE DRAWINGS

FIG. 6A is a diagram illustrating an example of the transition of apparatuses in the related art.

FIG. 6B is a diagram illustrating an example the transition of apparatuses according to the first embodiment.

DESCRIPTION OF THE EMBODIMENTS

First Embodiment

A first embodiment of the present disclosure will be described.

Figure 1:
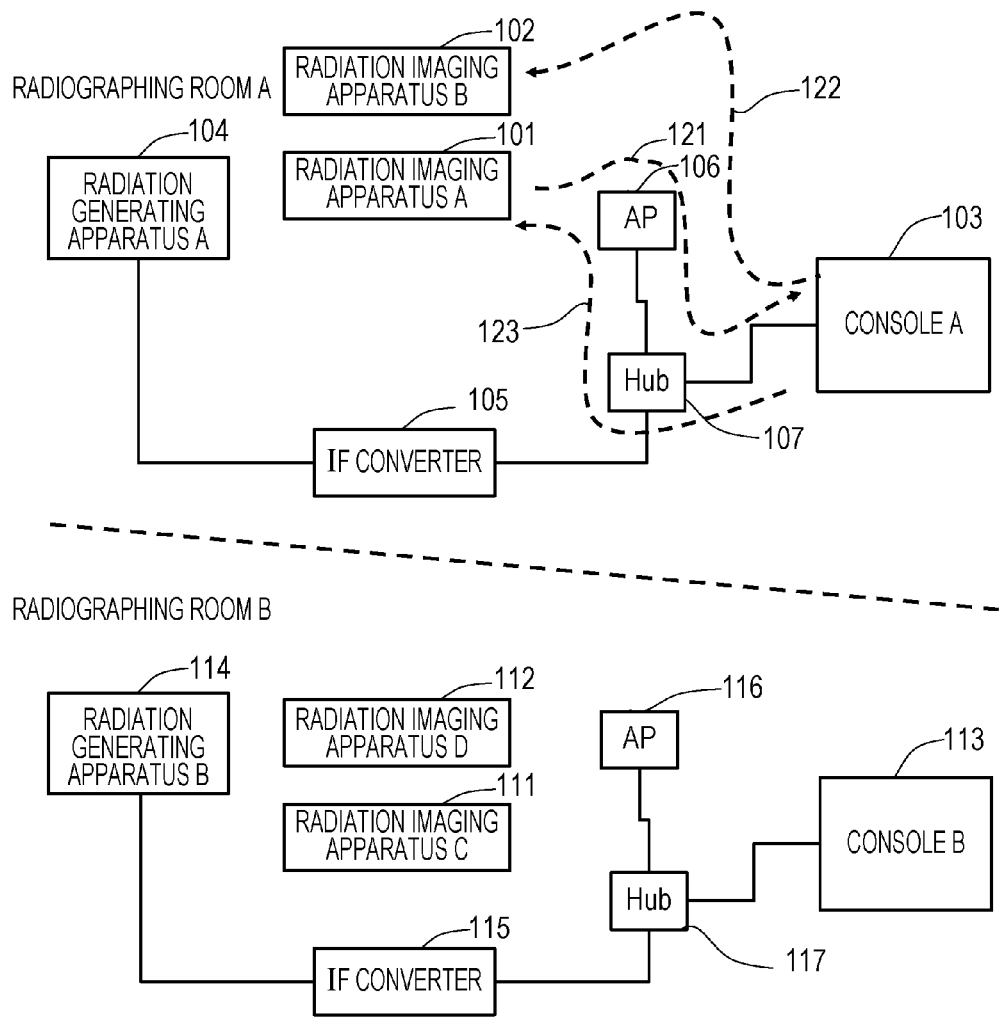
FIG. 1 is a diagram illustrating an example of the configuration of a radiographing system according to an embodiment of the present disclosure.

FIG. 1 is a diagram illustrating an example of the configuration of a radiographing system according to an embodiment of the present disclosure. The radiographing system of this embodiment is a radiographing system including a plurality of radiation imaging apparatuses and a control computer for controlling the radiation imaging apparatuses that communicates with the radiation imaging apparatuses.

In FIG. 1, a console A 103 is a computer (a control computer) for controlling radiation imaging apparatuses A 101 and B 102, and a console B 113 is a computer (a control computer) for controlling radiation imaging apparatuses C 111 and D 112. The radiation imaging apparatuses A 101, B 102, C 111, and D 112 each include a sensor for detecting radiation. The radiation imaging apparatuses A 101 and B 102 detect radiation emitted from a radiation generating apparatus A 104 and generate radiographic images. The radiation imaging apparatuses C 111 and D 112 detect radiation emitted from a radiation generating apparatus B 114 and generate radiographic images. The radiation imaging apparatuses A 101, B 102, C 111, and D 112 include a wireless communication function and transmit and receive image data on the radiographic images and various commands by wireless communication.

The radiation generating apparatuses A 104 and B 114 generate radiation according to an input instruction. Interface (IF) converters 105 and 115 respectively perform interface conversion in communication between the radiation generating apparatus A 104 and the radiation imaging apparatuses A 101 and B 102 or the console A 103 and communication between the radiation generating apparatus B 114 and the radiation imaging apparatuses C 111 and D 112 or the console B 113. For example, the IF converters 105 and 115 include a conversion function to convert between parallel signals and Ethernet® packets. Wireless access points (APs) 106 and 116 are devices for relaying wireless communication. Network switches (Hubs) 107 and 117 are devices for relaying data communication.

The radiation generating apparatuses A 104 and B 114 and the radiation imaging apparatuses A 101, B 102, C 111, and D 112 communicate with each other via the IF converters 105 and 115 to perform radiographing such that application of radiation using the radiation generating apparatus and radiographing using the radiation imaging apparatus are in timing with each other. Alternatively, the radiation generating apparatuses A 104 and B 114 and the radiation imaging apparatuses A 101, B 102, C 111, and D 112 may not communicate with each other, and the radiation imaging apparatuses A 101, B 102, C 111, and D 112 can start radiographing upon detecting radiation, that is, radiation detection radiographing.

The radiation imaging apparatuses A 101, B 102, C 111, and D 112 can be moved between a radiographing room A and a radiographing room B and can be used in either of the radiographing rooms A and B. When the radiation imaging apparatus A 101, B 102, C 111, or D 112 moves to a different radiographing room, the radiation imaging apparatus A 101, B 102, C 111, or D 112 associates with a console corresponding to the radiographing room. Examples of a method of association include infrared communication, connection using a cable, and Bluetooth® communication. The radiographing system illustrated in FIG. 1 is a mere example, and the number of radiation imaging apparatuses and the number of radiographing rooms are optional.

An example of an operation for shifting a radiation imaging apparatus to a state in which radiographing is enabled (a radiographing enabled state) in the radiographing system illustrated in FIG. 1 will be described. In the example, the radiation imaging apparatus A 101 and the radiation imaging apparatus B 102 associated with the console A 103 are located in the radiographing room A, as illustrated in FIG. 1, and the radiation imaging apparatus A 101 is shifted into the radiographing enabled state. The radiographing enabled state is a state in which radiation is detected by a sensor in the radiation imaging apparatus and a radiographic image can be generated. A state in which radiographing is disabled (a radiographing disabled state) is a state in which detection of radiation and generation of a radiographic image cannot performed.

First an operator performs a predetermined operation for bringing the radiation imaging apparatus A 101 into the radiographing enabled state, e.g., presses a predetermined button or operates a predetermined switch of the radiation imaging apparatus A 101. Upon detecting a predetermined operation for the radiographing enabled state, the radiation imaging apparatus A 101 transmits a command to shift into the radiographing enabled state (hereinafter referred to as "transition request command" 121) to the console A 103.

Upon receipt of the transition request command 121, the console A 103 transmits a command to shift other radiation imaging apparatuses associated with the console A 103 into the radiographing disabled state (hereinafter referred to "radiographing-disabled-state transition command" 122). In this example, the console A 103 transmits the radiographing-disabled-state transition command 122 to the radiation imaging apparatus B 102. The radiation imaging apparatus B 102, upon receipt of the radiographing-disabled-state transition command 122, shifts into the radiographing disabled state.

Next, the console A 103 transmits a command to shift the radiation imaging apparatus A 101, which is the source of the transition request command 121, into the radiographing enabled state (hereinafter referred to as "photographing-enabled-state transition command" 123). The radiation imaging apparatus A 101, upon receipt of the photographing-enabled-state transition command 123, shifts into the radiographing enabled state.

Figure 2:
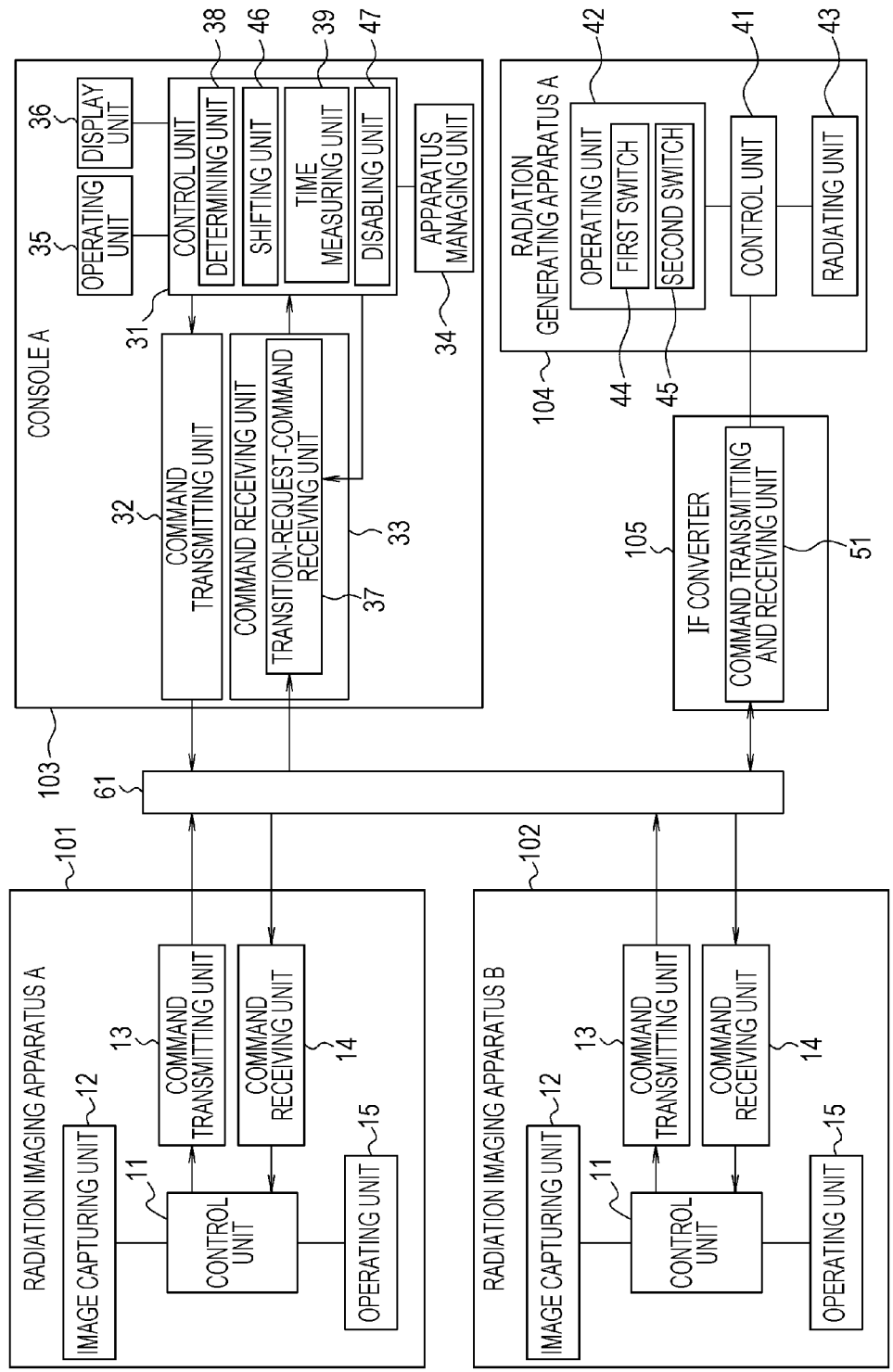
FIG. 2 is a diagram illustrating an example of the functional configuration of a radiographing system according to a first embodiment of the present disclosure.

FIG. 2 is a diagram illustrating an example of the functional configuration of the radiographing system according to the first embodiment. FIG. 2 illustrates a radiographing system including the radiation imaging apparatus A 101, the radiation imaging apparatus B 102, the console A 103, the radiation generating apparatus A 104, and the IF converter 105. The radiation imaging apparatus A 101, the radiation imaging apparatus B 102, the console A 103, and the IF converter 105 are connected so as to communicate with each another via a communication path 61 including the wireless access point, shown in FIG. 1, and a network switch.

The radiation imaging apparatus A 101 and the radiation imaging apparatus B 102 each include a control unit 11, an image capturing unit 12, a command transmitting unit 13, a command receiving unit 14, and an operating unit 15. The control unit 11 controls the individual functional units in the radiation imaging apparatus A 101 or B 102. For example, the control unit 11 brings the radiation imaging apparatus A 101 or B 102 into the radiographing enabled state or the radiographing disabled state according to a command received by the command receiving unit 14.

When the radiation imaging apparatus A 101 or B 102 is in the radiographing enabled state, the image capturing unit 12 detects radiation applied from the radiation generating apparatus A 104 with a sensor and performs appropriate processing, such as correction, to generate a radiographic image. Image data on the radiographic image captured by the image capturing unit 12 is, for example, stored in a storage unit (not shown) or transferred to the console A 103 via a communication unit (not shown).

The command transmitting unit 13 transmits a command to another apparatus connected via the communication path 61 based on control by the control unit 11. In this embodiment, an example of the command transmitted by the command transmitting unit 13 is the transition request command 121.

The command receiving unit 14 receives a command transmitted from another apparatus connected via the communication path 61. The operating unit 15 is used by the operator to input an instruction to the radiation imaging apparatuses A 101 and B 102. The control unit 11 executes a control process corresponding to a command received by the command receiving unit 14 or an operation on the operating unit 15.

The console A 103 includes a control unit 31, a command transmitting unit 32, a command receiving unit 33, an apparatus managing unit 34, an operating unit 35, and a display unit 36. The control unit 31 controls the functional units in the console A 103. The control unit 31 executes a control process according to a command received by the command receiving unit 33 or an operation on the operating unit 35. For example, when the control unit 31 receives the transition request command 121 from the radiation imaging apparatus A 101 or B 102, the control unit 31 instructs the command transmitting unit 32 to transmit the photographing-enabled-state transition command 123 or the radiographing-disabled-state transition command 122 in response to the transition request command 121.

The control unit 31 includes a determining unit 38, a shifting unit 46, and a time measuring unit 39. The determining unit 38 determines whether a command to shift the console A 103 to a state in which the transition request command 121 cannot be accepted (an acceptance disabled state) (hereinafter referred to as "acceptance-disabled-state setting command". The determining unit 38 also determines whether a command to shift the console A 103 to a state in which the transition request command 121 can be accepted (an acceptance enabled state) (hereinafter referred to as "disabled-acceptance cancel command"). The shifting unit 46 shifts the console A103 to the state in which the transition request command 121 can be accepted. The time measuring unit 39 measures the time elapsed after the console A 103 in the transition-request-command-acceptance disabled state enters the transition-request-command-acceptance disabled state.

The command transmitting unit 32 transmits a command to another apparatus connected via the communication path 61 based on control by the control unit 31. In this embodiment, examples of the command that the command transmitting unit 32 transmits include the photographing-enabled-state transition command 123 and the radiographing-disabled-state transition command 122.

The command receiving unit 33 receives a command transmitted from another apparatus connected via the communication path 61. The command receiving unit 33 includes a transition-request-command receiving unit 37 for receiving the transition request command 121. When the console A 103 is in the transition-request-command-acceptance disabled state, the control unit 31 disables the transition-request-command receiving unit 37 from accepting the transition request command 121 from another radiation imaging apparatus.

The apparatus managing unit 34 manages the radiation imaging apparatuses A 101 and B 102 associated with the console A 103 and their states, i.e., whether the radiation imaging apparatuses A 101 and B 102 are in the radiographing enabled state or the radiographing disabled state. The operating unit 35 enables the operator to input an instruction to the console A 103. The display unit 36 displays an operating screen, a state display screen, and a captured radiographic image in the radiographing system.

The radiation generating apparatus A 104 includes a control unit 41, an operating unit 42, and a radiating unit 43.

The control unit 41 controls the radiation generating apparatus A 104 according to an operation on the operating unit 42 or a signal from the IF converter 105. The operating unit 42 enables the operator to input an instruction to the radiation generating apparatus A 104. The radiating unit 43 emits radiation based on control by the control unit 41.

The operating unit 42 includes a first switch 44 for providing an instruction to start preparation for emitting radiation and a second switch 45 for providing an instruction to emit radiation. When the first switch 44 is pressed, the control unit 41 causes the radiating unit 43 to start preparations for emitting radiation and outputs a radiation warning signal external to the radiation generating apparatus A 104. When the second switch 45 is pressed after the first switch 44 is pressed, the control unit 41 causes the radiating unit 43 to emit radiation and outputs a radiation-warning cancel signal external to the radiation generating apparatus A 104.

The IF converter 105 includes a command transmitting and receiving unit 51 that transmits a command to and receives a command from another apparatus connected via the communication path 61. Upon receipt of a command, the command transmitting and receiving unit 51 outputs a signal corresponding to the received command to the radiation generating apparatus A 104. The command transmitting and receiving unit 51 also transmits a command corresponding to a signal output from the radiation generating apparatus A 104 to another apparatus connected via the communication path 61.

In this embodiment, examples of the command that the command transmitting and receiving unit 51 transmits include an acceptance-disabled-state setting command and a disabled-acceptance cancel command. Upon receipt of a radiation warning signal from the radiation generating apparatus A 104, the command transmitting and receiving unit 51 transmits an acceptance-disabled-state setting command. Upon receipt of a radiation-warning cancel signal from the radiation generating apparatus A 104, the command transmitting and receiving unit 51 transmits a disabled-acceptance cancel command.

Figure 3:
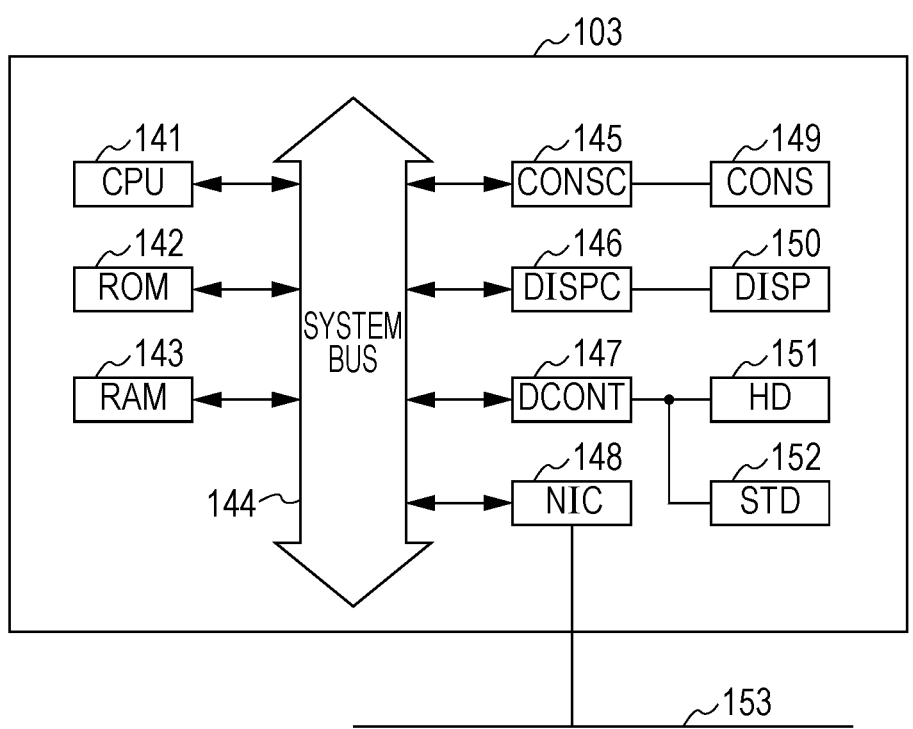
FIG. 3 is a diagram illustrating an example of the configuration of a console of the first embodiment.

FIG. 3 is a diagram illustrating an example of the configuration of the consoles A 103 and B 113 in this embodiment. While FIG. 3 illustrates the console A 103 by way of example, console B 113 has the same configuration. Console A 103 includes a CPU 141, a ROM 142, and a RAM 143. Console A 103 also includes a controller (CONSC) 145 for an operating unit (CONS) 149 and a display controller (DISPC) 146 for a display (DISP) 150 serving as a display unit. Console A 103 includes a hard disk (HD) 151, a controller (DCONT) 147 for a storage device (STD) 152, such as a flexible disk, and a network interface card (NIC) 148. The above described functional units are communicably connected with one another via a system bus 144.

The CPU 141 integrally controls the components connected to the system bus 144 by executing software stored in the ROM 142 or the HD 151 or software supplied from the STD 152. The RAM 143 functions as a main memory or a work area for the CPU 141. In this embodiment, the functions of determining, shifting, disabling and so on can be implemented by reading a processing program for performing operations, described below, from the ROM 142 or the like and executing the program with the CPU 141.

The CONSC 145 performs control based on an instruction input from the CONS 149. The DISPC 146 controls the display of the DISP 150. The DCONT 147 controls access to the HD 151 and the STD 152 that store a boot program, various applications (processing programs), user files, a network managing program, etc. The NIC 148 bi-directionally exchanges data with other apparatuses, e.g., radiation imaging apparatus, IF converter, etc., on a network 153.

Figure 4:
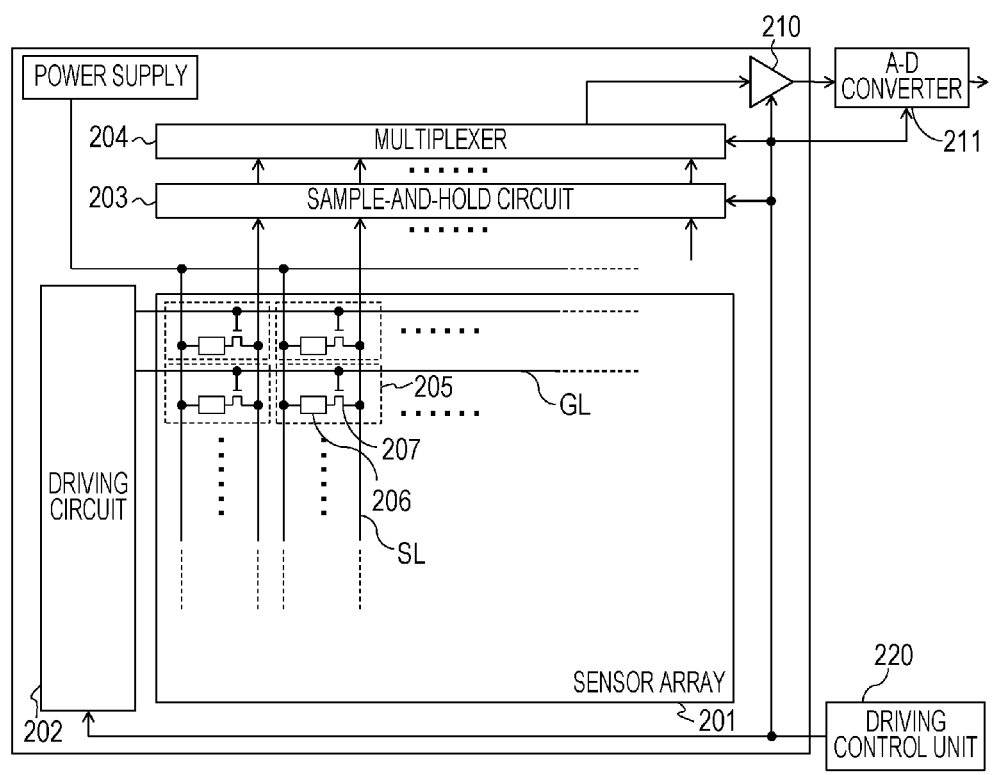
FIG. 4 is a diagram illustrating an example of the configuration of a sensor in the radiation imaging apparatus according to the first embodiment.

FIG. 4 is a diagram illustrating an example of the configuration of a sensor in the radiation imaging apparatus A102 or B112. A two-dimensional sensor array 201 includes a plurality of pixels 205 each including a photoelectric conversion element 206 and a TFT transistor 207 disposed in matrix form. The gate of the TFT transistor 207 is connected to a gate line GL driven by a drive circuit 202. The photoelectric conversion element 206 is connected to a signal line SL on a corresponding column via the TFT transistor 207.

The pixels 205 on one row of the two-dimensional sensor array 201 are simultaneously addressed by the drive circuit 202, and the charges on the pixels 205 are held in a sample-and-hold circuit 203. Then, the held charges of the pixels are read in sequence via a multiplexer 204, amplified by an amplifier 210, and then converted to digital values by an analog-to-digital converter (an A-D converter) 211. Upon completion of every time scanning of each row, the drive circuit 202 scans the next row of the sensor array 201 so that all of the charges of the pixels are finally converted to digital values. Thus, radiographic image data can be read.

By scanning the individual signal lines SL while fixing a voltage applied to the signal lines SL to a specific value and not maintaining acquired charges after reading, dark charges are discharged to initiate the sensor scanning. The driving and reading operations of the components of the sensor are controlled by a driving control unit 220. By performing offset correction in which offset image data obtained only from dark charge components without applying radiation is subtracted from the radiographic image data converted to digital values, a radiographic image in which unnecessary dark charge components are removed can be obtained.

Figure 5:
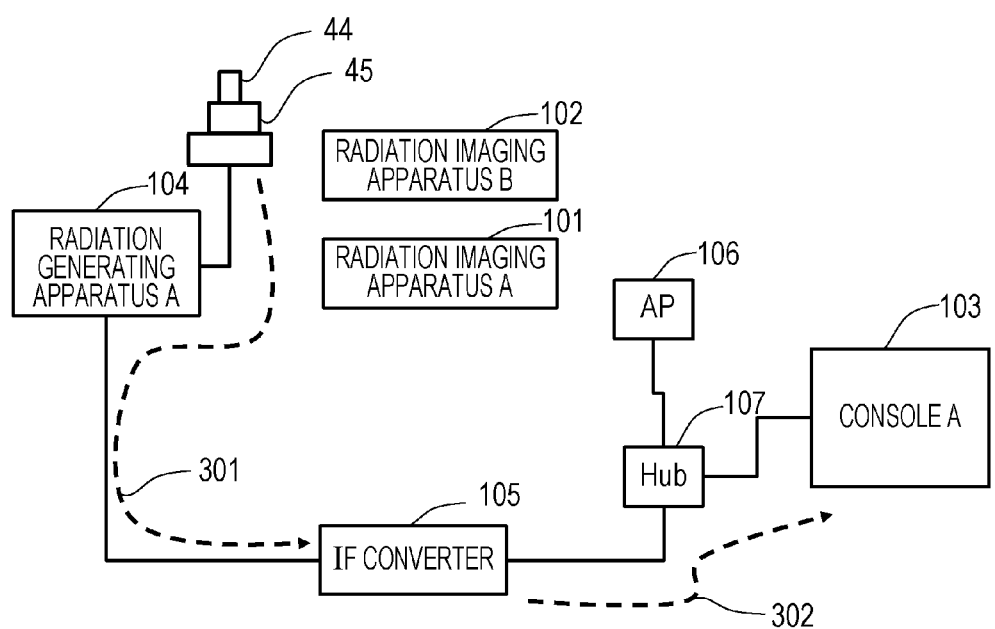
FIG. 5 is a diagram illustrating the operation of the radiographing system according to the first embodiment.

FIG. 5 is a diagram illustrating the operation of the radiographing system according to the first embodiment. The radiographing room A contains the radiation imaging apparatus A 101 and the radiation imaging apparatus B 102. The radiation imaging apparatus A 101 and the radiation imaging apparatus B 102 are associated with the console A 103. As described above, the radiation generating apparatus A 104 includes the first switch 44 for providing an instruction to start preparation for emitting radiation and the second switch 45 for providing an instruction to emit radiation. When the first switch 44 is pressed, the radiation generating apparatus A 104 transmits a radiation warning signal 301.

Upon receipt of the radiation warning signal 301 when the radiation imaging apparatus A 101 is in the radiographing enabled state, the IF converter 105 transmits an acceptance-disabled-state setting command 302 to the console A 103. Upon receipt of the acceptance-disabled-state setting command 302, the console A 103 transitions to a state in which the transition request command 121 cannot be accepted (an acceptance disabled state).

When the radiation imaging apparatus B 102 is moved to the radiographing room B, and an operation for bringing the radiation imaging apparatus B 102 into the radiographing enabled state without associating it with the console B 113, the radiation imaging apparatus B 102 transmits the transition request command 121 to the console A 103. However, since the console A 103 does not accept the transition request command 121, the radiation imaging apparatus B 102 does not shift into the radiographing enabled state. When the operator of the radiation imaging apparatus A 101 presses the second switch 45 following pressing of the first switch 44, the radiation generating apparatus A 104 emits radiation for radiographing.

When the operator releases the first switch 44 or when the emission of radiation is complete, the radiation generating apparatus A 104 transmits a radiation-warning cancel signal to the IF converter 105. Upon receipt of the radiation-warning cancel signal, the IF converter 105 transmits a disabled-acceptance cancel command to the console A 103. Upon receipt of the disabled-acceptance cancel command, the console A 103 shifts to a state in which the transition request command 121 can be accepted (an acceptance enabled state).

FIGS. 6A and 6B are diagrams illustrating examples of the state transition of the radiation imaging apparatuses A 101 and B 102 in the radiographing system. FIG. 6A illustrates an example in which the control operation according to the first embodiment is not applied. FIG. 6B illustrates an example in which the control operation according to the first embodiment is applied. The radiation imaging apparatus A 101 and the radiation imaging apparatus B 102 are associated with the console A 103.

In the example of FIG. 6A, the radiation imaging apparatus A 101 transmits the transition request command 121 to the console A 103. The console A 103, in response, transmits the photographing-enabled-state transition command 123 to the radiation imaging apparatus A 101. The radiation imaging apparatus A 101 then shifts into a radiographing enabled state (321). The radiation imaging apparatus B 102 receives the radiographing-disabled-state transition command 122 from the console A 103, and the radiation imaging apparatus B 102 shifts into a radiographing disabled state.

Next, the radiation imaging apparatus B 102 transmits the transition request command 121 to the console A 103 immediately before radiographing is performed using the radiation imaging apparatus A 101. The console A 103 transmits the photographing-enabled-state transition command 123 to the radiation imaging apparatus B 102 in response to the transition request command 121 from the radiation imaging apparatus B 102. The radiation imaging apparatus B 102 then shifts into a radiographing enabled state (322).

The radiation imaging apparatus A 101 receives the radiographing-disabled-state transition command 122 from the console A 103, and the radiation imaging apparatus A 101 shifts into a radiographing disabled state. If the radiation generating apparatus A 104 emits radiation without awareness of it, the radiation imaging apparatus B 102 performs the imaging. Accordingly, the object intended to be radiographed by the radiation imaging apparatus A 101 is exposed to radiation, but the radiation imaging apparatus B 102 forms an image, which is invalid. This results in the object receiving radiation exposure with no associated image being formed.

In contrast, in the example shown in FIG. 6B, the radiation imaging apparatus A 101 transmits the transition request command 121 to the console A 103. The console A 103, in response, transmits the photographing-enabled-state transition command 123 to the radiation imaging apparatus A 101, and the radiation imaging apparatus A shifts into a radiographing enabled state (332). The radiation imaging apparatus B 102 receives the radiographing-disabled-state transition command 122 from the console A 103, and shifts into a radiographing disabled state.

Next, when the first switch 44 of the radiation generating apparatus A 104 is pressed to perform radiographing using the radiation imaging apparatus A 101 (331), the radiation generating apparatus A 104 transmits a radiation warning signal 301 to the IF converter. Upon receipt of the radiation warning signal 301, the IF converter 105 transmits an acceptance-disabled-state setting command 302 to the console A 103. The console A 103 shifts to a state in which the transition request command 121 cannot be accepted (an acceptance disabled state) (333).

When the radiation imaging apparatus B 102 transmits the transition request command 121 to the console A 103, the radiation imaging apparatus B 102 does not shift into the radiographing enabled state because the console A 103 does not accept the transition request command 121, and the radiation imaging apparatus A 101 is kept in the radiographing enabled state. When the radiation generating apparatus A 104 emits radiation (330), radiographing is performed by the radiation imaging apparatus A 101 to form a valid radiographic image. After emitting radiation, the radiation generating apparatus A 104 transmits a radiation-warning cancel signal to the IF converter. Upon receipt of the radiation-warning cancel signal, the IF converter 105 transmits a disabled-acceptance cancel command to the console A 103. The console A 103 then shifts to a state in which the transition request command 121 can be accepted (an acceptance enabled state).

Figure 7:
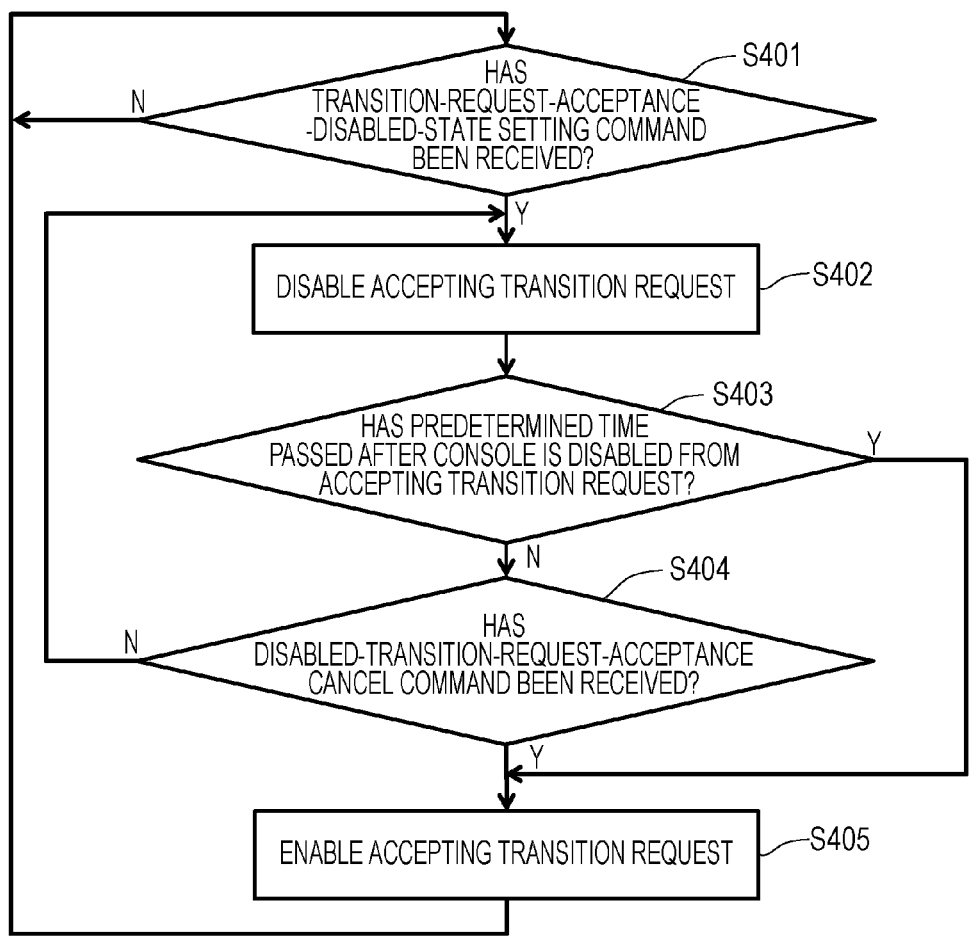
FIG. 7 is a flowchart of an operation example according to the first embodiment.

FIG. 7 is a flowchart of an operation example of the console A 103 of the first embodiment that executes switching between the transition-request-command-acceptance enabled state and the acceptance disabled state. At step S401, the control unit 31 of the console A 103 determines, using the determining unit 38, whether an acceptance-disabled-state setting command 302 has been received.

If the determining unit 38 determines that the acceptance-disabled-state setting command 302 has not been received, the determining unit 38 repeats the process at step S401. If the determining unit 38 determines that the acceptance-disabled-state setting command 302 has been received, then at step S402, the control unit 31 brings the console A 103 into a transition-request-command-acceptance disabled state and starts time measurement using the time measuring unit 39. Even in the transition-request-command-acceptance disabled state, the radiation imaging apparatus A 101 or B 102 can be shifted into a radiographing enabled state by operation of the console A 103.

Next at step S403, the control unit 31 determines, based on the time measured by the time measuring unit 39, whether a predetermined time has passed from the time the console A 103 enters the transition-request-command-acceptance disabled state. If the control unit 31 determines that a predetermined time has passed, then at step S405, the control unit 31 brings the console A 103 into a transition-request-command-acceptance enabled state and the process returns to step S401.

If the control unit 31 determines that a predetermined time has not passed from the time the console A 103 enters the transition-request-command-acceptance disabled state, then at step S404, the control unit 31 determines, using the determining unit 38, whether a disabled-acceptance cancel command has been received. If the determining unit 38 determines that the disabled-acceptance cancel command has been received, then at step S405, the control unit 31 brings the console A 103 to a transition-request-command-acceptance enabled state, and the process returns to step S401. If the determining unit 38 determines that the disabled-acceptance cancel command has not been received, the process returns to step S402.

According to the first embodiment, for example, when the first switch 44 of the radiation generating apparatus A 104 is pressed when the radiation imaging apparatus A 101 is in the radiographing enabled state, the console A 103 enters an acceptance disabled state in which the transition request command 121 cannot be accepted. In this state, if the radiation imaging apparatus B 102 is moved to the radiographing room B, and an operation for bringing the radiation imaging apparatus B 102 into a radiographing enabled state without associating the radiation imaging apparatus B 102 with the console B 113, the console A 103 does not accept the transition request command 121. For this reason, the radiation imaging apparatus B 102 does not shift into the radiographing enabled state, and the radiation imaging apparatus A 101 is kept in the radiographing enabled state. Then, when the operator of the radiation imaging apparatus A 101 presses the second switch 45 following the first switch 44, radiographing using the intended radiation imaging apparatus A 101 is performed.

As described above, even when an operation for bringing the radiation imaging apparatus B 102 into the radiographing enabled state is performed immediately before the radiation imaging apparatus A 101 is used for radiographing, the radiation imaging apparatus A 101 can be kept in the radiographing enabled state. This prevents a radiation imaging apparatus that has been brought into a radiographing enabled state to be used in radiographing from being unintentionally switched to another radiation imaging apparatus after the radiation imaging apparatus to be used is brought into a radiographing enabled state.

Although this embodiment is an example in which a radiation warning signal and a radiation-warning cancel signal are transmitted by operating the switches of a radiation generating apparatus, the present disclosure is not limited to the example. For example, the radiation warning signal can be transmitted during emission of visible light for determining the position and range of irradiation exposure by operation of a collimator, and the radiation-warning cancel signal can be transmitted at the stop of the visible light. In another example, the radiation warning signal is transmitted when the door of the radiographing room is closed, and the radiation-warning cancel signal is transmitted when the door of the radiographing room is opened.

Although this embodiment is an example in which a radiation generating apparatus transmits the radiation warning signal and the radiation-warning cancel signal to an IF converter, and the IF converter, which has received the signals, transits an acceptance-disabled-state setting command and a disabled-acceptance cancel command to a console, the present disclosure is not limited to the example. For example, the radiation generating apparatus can directly transmit the acceptance-disabled-state setting command and the disabled-acceptance cancel command to the console. Alternatively, other commands that the console receives can serve as the acceptance-disabled-state setting command and the disabled-acceptance cancel command.

In some embodiments, the radiation imaging apparatus includes a transition-request-command disabling button and a disabling cancel button regardless of the presence of the radiation warning signal and the radiation-warning cancel signal. When the buttons are operated, the acceptance-disabled-state setting command and the disabled-acceptance cancel command are transmitted to the console. Alternatively, the acceptance-disabled-state setting command and the disabled-acceptance cancel command can be transmitted to the console when a transition-request-command disabling button and a disabling cancel button of a remote switch connected to the radiation imaging apparatus are respectively operated regardless of the presence of the radiation warning signal and the radiation-warning cancel signal.

In some embodiments, a remote switch connected to the IF converter includes a transition-request-command disabling button and a disabling cancel button. When the buttons are operated, the acceptance-disabled-state setting command and the disabled-acceptance cancel command are respectively transmitted to the console. Alternatively, when a transition-request-command disabling button and a disabling cancel button are operated, the acceptance-disabled-state setting command and the disabled-acceptance cancel command can be respectively transmitted to the console.

Second Embodiment

Next, a second embodiment of the present disclosure will be described.

In the second embodiment, the radiation imaging apparatuses of the radiographing system each have a state in which a transition request command can be transmitted (a transmission enabled state) and a state in which transmission of the transition request command is disabled (a transmission disabled state). In the transition-request-command-transmission disabled state, each radiation imaging apparatus does not transmit the transition request command to the console even when the operator performs an operation for bringing the radiation imaging apparatus into the radiographing enabled state.

In the second embodiment, when the IF converter receives a radiation warning signal, the IF converter transmits a command to shift all communicable radiation imaging apparatuses to a state in which transmission of the transition request command is disabled (the transmission disabled state) (hereinafter referred to as "transmission-disabled-state setting command"). The radiation imaging apparatuses that receive the transmission-disabled-state setting command transition to a state in which transmission of the transition request command is disabled (the transmission disabled state).

When the IF converter receives a radiation-warning cancel signal, the IF converter transmits a command to shift all communicable radiation imaging apparatuses to a state in which the transition request command can be transmitted (the transmission enabled state) (hereinafter referred to as "transmission-disabled-state cancel command"). The radiation imaging apparatuses that receive the transmission-disabled-state cancel command transition to a state in which the transition request command can be transmitted (the transmission enabled state).

Figure 8:
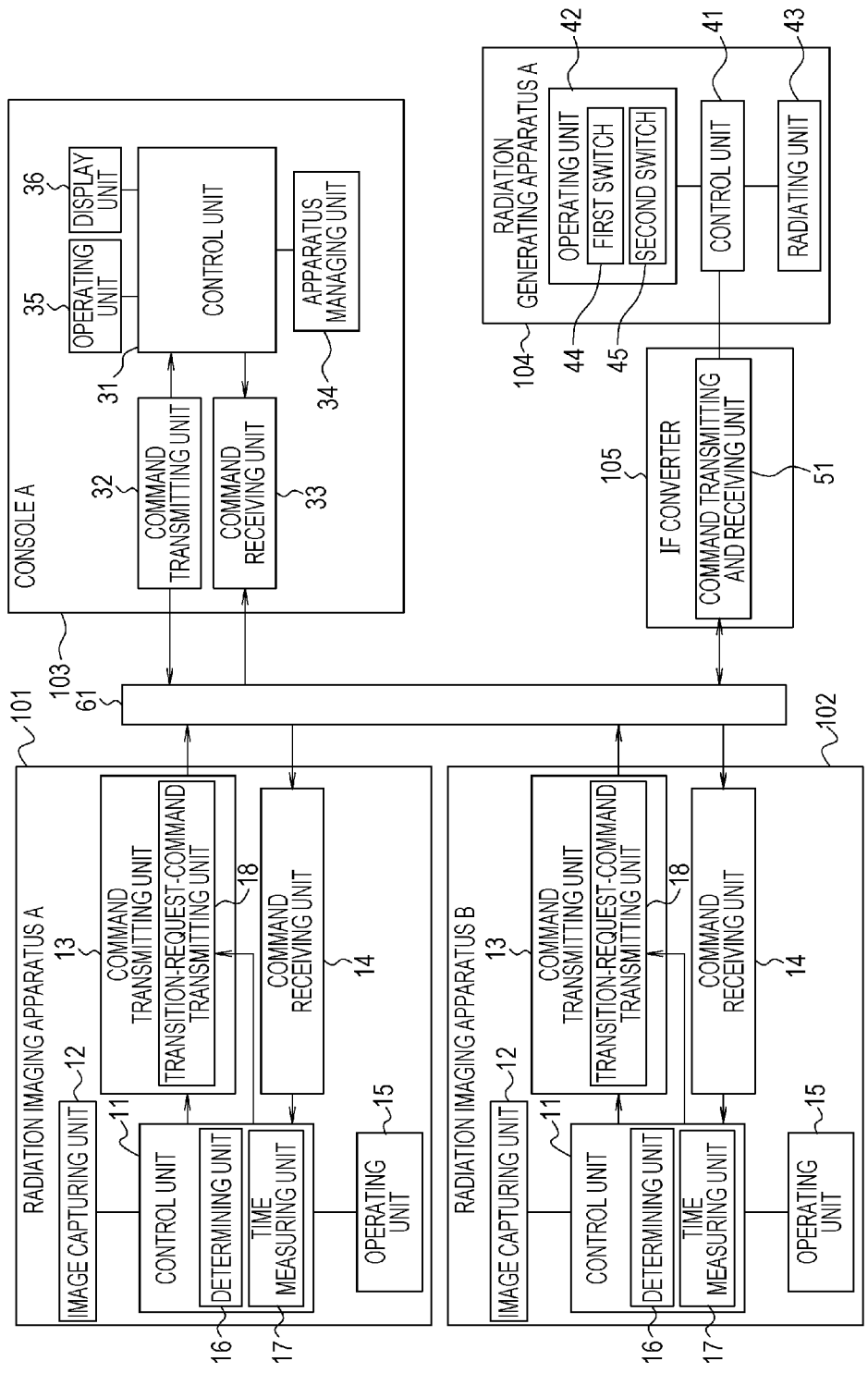
FIG. 8 is a diagram illustrating an example of the functional configuration of a radiographing system according to a second embodiment of the present disclosure.

The overall configuration of the radiographing system of the second embodiment will be omitted because it is the same as that of the radiographing system of the first embodiment. FIG. 8 is a diagram illustrating an example of the functional configuration of the radiographing system of the second embodiment. The components in FIG. 8, e.g., a radiation imaging apparatus A 101, a radiation imaging apparatus B 102, a console A 103, a radiation generating apparatus A 104, and an IF converter 105 have the same functions as those of the components of FIG. 2. As such, the same reference numbers are used for the components illustrated in FIG. 8, and some duplicated description will be omitted. In some instances, to simply the discussion, only radiation imaging apparatus A 101 will be referenced. In those cases however, the discussion is also applicable to radiation imaging apparatus B 102.

The radiation imaging apparatus A 101 and the radiation imaging apparatus B 102 each include a control unit 11, an image capturing unit 12, a command transmitting unit 13, a command receiving unit 14, and an operating unit 15. The control unit 11 controls the individual functional units in the radiation imaging apparatus A 101. The control unit 11 executes control processing according to a command received by the command receiving unit 14 and an operation on the operating unit 15.

For example, when the command receiving unit 14 receives the photographing-enabled-state transition command 123, the control unit 11 brings the radiation imaging apparatus A 101 into the radiographing enabled state. When the command receiving unit 14 receives the radiographing-disabled-state transition command 122, the control unit 11 brings the radiation imaging apparatus A 101 into the radiographing disabled state.

For example, when the command receiving unit 14 receives a transmission disabled-state setting command, the control unit 11 brings the radiation imaging apparatus A 101 into a transition-request-command-transmission disabled state. When the command receiving unit 14 receives a transmission-disabled-state cancel command, the control unit 11 brings the radiation imaging apparatus A 101 into a transition-request-command-transmission enabled state.

The control unit 11 includes a determining unit 16, a shifting unit 46, and a time measuring unit 17. The determining unit 16 determines whether the transmission-disabled-state setting command and the transmission-disabled-state cancel command have been received. The shifting unit 46 shifts the radiation imaging apparatus A 101 into the radiographing enabled or radiographing disabled state. The time measuring unit 17 measures the time elapsed from the time the radiation imaging apparatus A 101 in the transition-request-command-transmission disabled state enters the transition-request-command-transmission disabled state.

The command transmitting unit 13 transmits a command to other apparatuses connected via the communication path 61 based on control by the control unit 11. The command transmitting unit 13 includes a transition-request-command transmitting unit 18 that transmits the transition request command 121. When the radiation imaging apparatus A 101 is in the transition-request-command-transmission disabled state, the transition-request-command transmitting unit 18 is disabled from transmitting the transition request command 121 by the control unit 11.

In this embodiment, examples of commands that the command transmitting and receiving unit 51 of the IF converter 105 transmits include a transmission-disabled-state setting command and a transmission-disabled-state cancel command. Upon receipt of a radiation warning signal 301 from the radiation generating apparatus A 104, the command transmitting and receiving unit 51 transmits the transmission-disabled-state setting command. Upon receipt of a radiation-warning cancel signal from the radiation generating apparatus A 104, the command transmitting and receiving unit 51 transmits the transmission-disabled-state cancel command.

Figure 9:
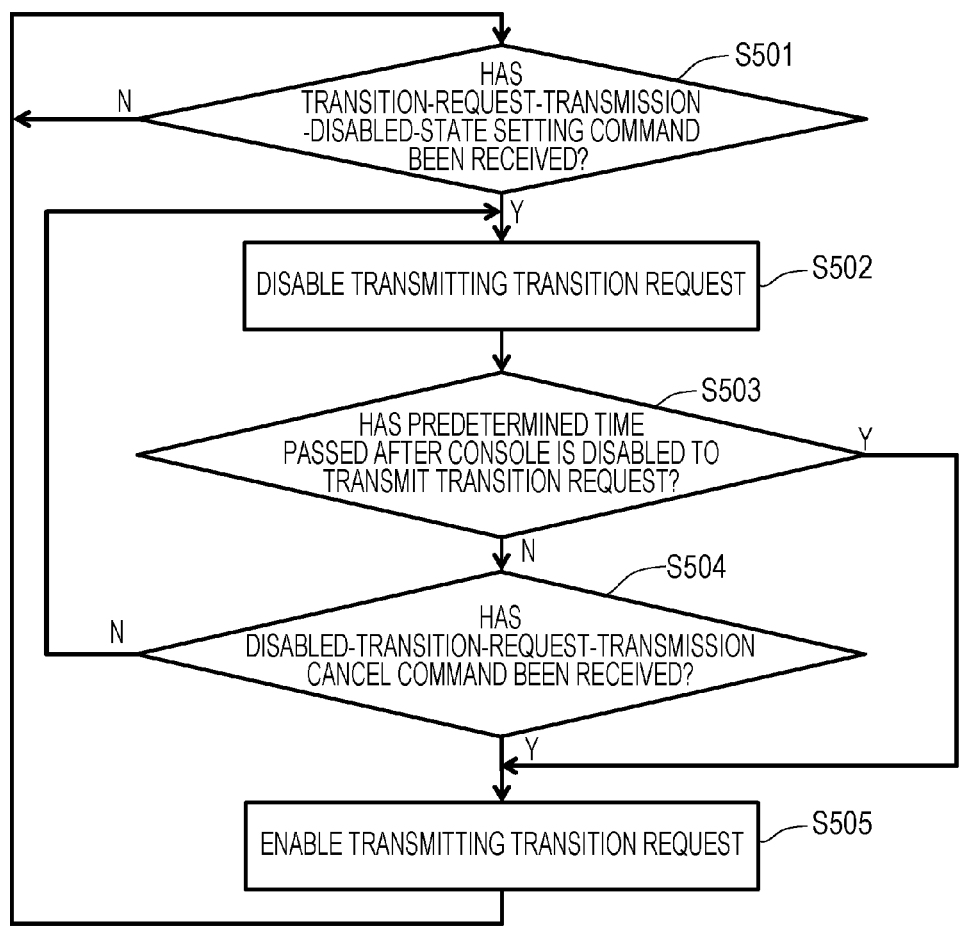
FIG. 9 is a flowchart illustrating an operation example according to the second embodiment.

FIG. 9 is a flowchart illustrating an operation example of the radiation imaging apparatus A 101 of the second embodiment that execute switching between the transition-request-command-transmission enabled state and the transmission disabled state. At step S501, the control unit 11 of the radiation imaging apparatus A 101 determines, using the determining unit 16, whether the transmission-disabled-state setting command has been received.

If the determining unit 16 determines that the transmission-disabled-state setting command has not been received, the determining unit 16 repeats the process at step S501. If the determining unit 16 determines that the transmission-disabled-state setting command has been received, then at step S502, the control unit 31 brings the radiation imaging apparatus A 101 into a transition-request-command-transmission disabled state and starts time measurement using the time measuring unit 17. Even when an operation for shifting the radiation imaging apparatus A 101 into the radiographing enabled state is performed in the transition-request-command-transmission disabled state, the radiation imaging apparatus A 101 does not transmit the transition request command 121 to the console.

Next, at step S503, the control unit 11 determines, based on the time measured by time measuring unit 17, whether a predetermined time has passed from the time the radiation imaging apparatus A 101 enters the transition-request-command-transmission disabled state. If the control unit 11 determines that a predetermined time has passed from the time the radiation imaging apparatus A 101 enter the transition-request-command-transmission disabled state, then at step S505, the control unit 11 brings the radiation imaging apparatus into a transition-request-command-transmission enabled state and the process returns to step S501.

If the control unit 11 determines that a predetermined time has not passed from the time the radiation imaging apparatus A 101 enters the transition-request-command-transmission disabled state, then at step S504, the control unit 11 determines, using the determining unit 16, whether a disabled-transmission cancel command has been received. If the determining unit 16 determines that the disabled-transmission cancel command has been received, then at step S505, the control unit 11 brings the radiation imaging apparatus A 101 to a transition-request-command-transmission enabled state and the process returns to step S501. If the determining unit 16 determines that the disabled-transmission cancel command has not been received, the process returns to step S502.

According to the second embodiment, for example, when the first switch 44 of the radiation generating apparatus A 104 is pressed when the radiation imaging apparatus A 101 is in the radiographing enabled state, other radiation imaging apparatuses enter a transmission disabled state in which the transition request command 121 cannot be transmitted. In this state, if the radiation imaging apparatus B 102 is moved to the radiographing room B, and an operation for bringing the radiation imaging apparatus B 102 into a radiographing enabled state without associating with the console B 113, the radiation imaging apparatus B 102 does not transmit the transition request command 121 to the console A 103. For this reason, the radiation imaging apparatus B 102 does not shift into the radiographing enabled state, and the radiation imaging apparatus A 101 is kept in the radiographing enabled state. Then, when the operator of the radiation imaging apparatus A 101 presses the second switch 45 following the first switch 44, radiographing using the intended radiation imaging apparatus A 101 is performed.

As described above, even when an operation for bringing the radiation imaging apparatus B 102 into the radiographing enabled state is performed immediately before the radiation imaging apparatus A 101 is used for radiographing, the radiation imaging apparatus A 101 can be kept in the radiographing enabled state. This prevents a radiation imaging apparatus brought into a radiographing enabled state to be used in radiographing from being unintentionally switched to another radiation imaging apparatus after the radiation imaging apparatus to be used is brought into a radiographing enabled state.

Although this embodiment is an example in which an IF converter transmits the transmission-disabled-state setting command and the transmission-disabled-state cancel command to all communicable radiation imaging apparatuses when receiving the radiation warning signal or the radiation warning cancel signal, the present disclosure is not limited to the example. For example, the console can receive the radiation warning signal or the radiation warning cancel signal and transmit the transmission-disabled-state setting command or the transmission-disabled-state cancel command to the other radiation imaging apparatuses. Alternatively, the IF converter that receives the radiation warning signal or the radiation warning cancel signal can transmit a command to one radiation imaging apparatus. The radiation imaging apparatus that receives the command can transmit the transmission-disabled-state setting command or the transmission-disabled-state cancel command to all the other radiation imaging apparatuses.

In some embodiments, the radiation imaging apparatuses each include a transition-request-command disabling button and a disabling cancel button. When the buttons are operated, the transmission-disabled-state setting command and the disabled-transmission cancel command are transmitted to the other radiation imaging apparatuses. Alternatively, the transmission-disabled-state setting command and the disabled-transmission cancel command can be transmitted to the other radiation imaging apparatuses when a transition-request-command disabling button and a disabling cancel button of a remote switch connected to each radiation imaging apparatus are respectively operated.

In some embodiments, a remote switch connected to the IF converter includes a transition-request-command disabling button and a disabling cancel button. When the buttons are operated, the transmission-disabled-state setting command and the disabled-transmission cancel command are respectively transmitted to the individual radiation imaging apparatuses. Alternatively, when a transition-request-command disabling button and a disabling cancel button are operated, the transmission-disabled-state setting command and the disabled-transmission cancel command can be respectively transmitted to the individual radiation imaging apparatuses.

Third Embodiment

Next, a third embodiment of the present disclosure will be described.

In the third embodiment, the consoles of the radiographing system each have a state in which the transition request command 121 can be accepted (an acceptance enabled state) and a state in which the transition request command 121 cannot be accepted (an acceptance disabled state) and switch between the states according to an operation on the consoles. Even when the operator performs an operation to bring a radiation imaging apparatus into the radiographing enabled state to transmit the transition request command 121, a console in the transition-request-command-acceptance disabled state does not accept the transition request command 121. Only differences between the radiographing system of the third embodiment and the radiographing system of the first embodiment will be described.

Figure 10:
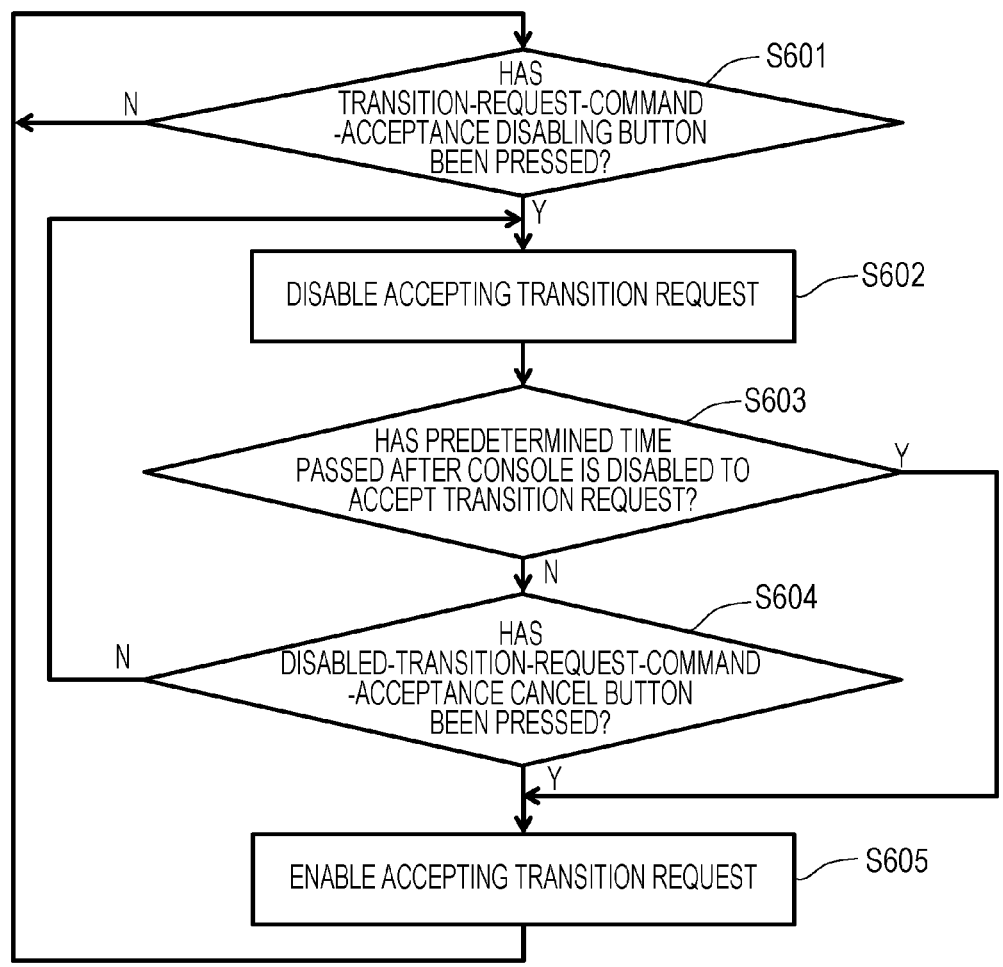
FIG. 10 is a flowchart illustrating an operation example according to a third embodiment of the present disclosure.

FIG. 10 is a flowchart illustrating an operation example of the console A 103 of the third embodiment that switches between the transition-request-command-acceptance enabled state and the acceptance disabled state. At step S601, the control unit 31 of the console A 103 determines whether a transition-request-command-acceptance disabling button of the operating unit 35 has been pressed.

If the control unit 31 determines that the transition-request-command-acceptance disabling button has not been pressed, the control unit 31 repeats the process at step S601. If the control unit 31 determines that the transition-request-command-acceptance disabling button has been pressed, then at step S602, the control unit 31 brings the console A 103 to a transition-request-command-acceptance disabled state and starts time measurement with the time measuring unit 39.

Next at step S603, the control unit 31 determines, based on the time measured by the time measuring unit 39, whether a predetermined time has passed from the time the console A 103 enters the transition-request-command-acceptance disabled state. If the control unit 31 determines that the predetermined time has passed from the time the console A 103 enters the transition-request-command-acceptance disabled state, then at step S605, the control unit 31 brings the console A 103 into a transition-request-command-acceptance enabled state and the process returns to step S601.

If the control unit 31 determines that the predetermined time has not passed from the time the console A 103 enters the transition-request-command-acceptance disabled state, then at step S604, the control unit 31 determines whether a disabled-transition-request-command-acceptance cancel button has been pressed. If the control unit 31 determines that the disabled-transition-request-command-acceptance cancel button has been pressed, then at step S605, the control unit 31 brings the console A 103 into a transition-request-command-acceptance enabled state and the process to step S601. If the control unit 31 determines that the disabled-transition-request-command-acceptance cancel button has not been pressed, the process returns to step S602.

The third embodiment prevents a radiation imaging apparatus to be used in radiographing from being unintentionally switched to another radiation imaging apparatus after the radiation imaging apparatus to be used is brought into a radiographing enabled state by setting the console to the transition-request-command-acceptance enabled state.

Although this embodiment is an example in which the state of the console is switched when the transition-request-command-acceptance disabling button or the disabled-transition-request-command-acceptance cancel button is operated, the present disclosure is not limited to the example. The same operation performed when the transition-request-command-acceptance disabling button or the disabled-transition-request-command-acceptance cancel button is operated can be performed when a button or switch assigned to another function of the console is operated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present disclosure have been described with reference to exemplary embodiments, it is to be understood that the aspects of the disclosure are not limited to the disclosed exemplary embodiments. The scope of the following claims is to be accorded the broadest interpretation so as to encompass all such modifications and equivalent structures and functions.

This application claims the benefit of Japanese Patent Application No. 2015-203139, filed Oct. 14, 2015, which is hereby incorporated by reference herein in its entirety.

What is claimed is:

1. A radiographing system comprising:
a plurality of radiation imaging apparatuses configured to detect radiation and to form a radiographic image; and
a control apparatus configured to control the plurality of radiation imaging apparatuses, wherein the control apparatus comprises:
a memory; and
a processor, the processor configured to control:
a shifting unit configured to, in response to a transition request from a radiation imaging apparatus to shift the radiation imaging apparatus into a radiographing enabled state, shift the radiation imaging apparatus into the radiographing enabled state in which radiation is detected and a radiographic image is generated,
a determining unit configured to determine whether to disable shifting the radiation imaging apparatus into the radiographing enabled state based on control for radiographing using a different radiation imaging apparatus currently in the radiographing enabled state, and
a disabling unit configured to disable shifting the radiation imaging apparatus into the radiographing enabled state based on a determination result.

2. The radiographing system according to claim 1, wherein the disabling unit disables acceptance of the transition request transmitted from the radiation imaging apparatus.

3. The radiographing system according to claim 1, wherein the disabling unit disables transmission of the transition request from the radiation imaging apparatus.

4. The radiographing system according to claim 1,
wherein, based on a radiation warning signal, the determining unit determines to disable shifting the radiation imaging apparatus into the radiographing enabled state, and
wherein, based on a radiation-warning cancel signal, the determining unit determines not to disable shifting the radiation imaging apparatus to the radiographing enabled state.

5. The radiographing system according to claim 4, further comprising a radiation generating apparatus that emits radiation, wherein the radiation generating apparatus comprises:
   a first switch for providing an instruction to start preparation for emitting radiation, and
   a second switch for providing an instruction to emit radiation,
   wherein, when the first switch is pressed, the radiation generating apparatus outputs the radiation warning signal, and
   wherein, when the first switch is released or when application of radiation is complete, the radiation generating apparatus outputs the radiation-warning cancel signal.

6. The radiographing system according to claim 4, further comprising a radiation generating apparatus that emits radiation,
   wherein, when visible light for determining an irradiation position and an irradiation range is emitted, the radiation generating apparatus outputs the radiation warning signal, and
   wherein, when the visible light is stopped, the radiation generating apparatus outputs the radiation-warning cancel signal.

7. The radiographing system according to claim 4, further comprising a transmitting unit configured to, in response to receipt of the radiation warning signal, transmit an instruction to the control apparatus to disable shifting the radiation imaging apparatus into the radiographing enabled state and to, in response to the radiation-warning cancel signal, transmit an instruction not to disable shifting the radiation imaging apparatus into the radiographing enabled state,
   wherein the determining unit determines whether to disable or not disable shifting the radiation imaging apparatus into the radiographing enabled state.

8. The radiographing system according to claim 1, wherein the determining unit determines whether to disable shifting the radiation imaging apparatus into the radiographing enabled state based on at least an operation on the radiation imaging apparatus or an operation on a device connected to the radiographing system.

9. A control apparatus for controlling a plurality of radiation imaging apparatuses that detect radiation generated from a radiation generating apparatus and form a radiographic image, the control apparatus comprising:
   a memory; and
   a processor, the processor configured to control:
      a shifting unit configured to, in response to a transition request from a radiation imaging apparatus to shift the radiation imaging apparatus into a radiographing enabled state, shift the radiation imaging apparatus to the radiographing enabled state in which radiation is detected and a radiographic image is generated,
      a determining unit configured to determine whether to disable shifting the radiation imaging apparatus into the radiographing enabled state based on control for radiographing using a different radiation imaging apparatus currently in the radiographing enabled state, and
      a disabling unit configured to disable shifting the radiation imaging apparatus into the radiographing enabled state based on a determination result.

10. A radiation imaging apparatus that detects radiation generated from a radiation generating apparatus and forms a radiographic image, the radiation imaging apparatus comprising:
   a transmission unit configured to transmit a transition request for shifting the radiation imaging apparatus into a radiographing enabled state; and
   a processor, the processor configured to control:
      a shifting unit configured to, in response to a command to shift the radiation imaging apparatus into a radiographing enabled state in which radiation is detected and a radiographic image is generated, shift the radiation imaging apparatus into the radiographing enabled state,
      a determining unit configured to determine whether to disable transmitting the transition request based on control for radiographing using a different radiation imaging apparatus in the radiographing enabled state, and
      a disabling unit configured to disable transmitting the transition request based on a determination result.

11. A method for controlling a radiographing system including a plurality of radiation imaging apparatuses that detect radiation and form a radiographic image, the method comprising:
   shifting, in response to a transition request from a radiation imaging apparatus to shift the radiation imaging apparatus into a radiographing enabled state, the radiation imaging apparatus into the radiographing enabled state in which radiation is detected and a radiographic image is generated;
   determining whether to disable shifting the radiation imaging apparatus into the radiographing enabled state based on control for radiographing using a different radiation imaging apparatus currently in the radiographing enabled state; and
   disabling shifting the radiation imaging apparatus into the radiographing enabled state based on a determination result.

12. The method according to claim 11, wherein acceptance of the transition request command is disabled.

13. The method according to claim 11, wherein transmission of the transition request command is disabled.

14. The method according to claim 11, further comprising determining, based on a radiation warning signal, to disable shifting the radiation imaging apparatus into the radiographing enabled state, and based on a radiation-warning cancel signal, not to disable shifting the radiation imaging apparatus into the radiographing enabled state.

15. The method according to claim 14, further comprising transmitting, in response to receipt of the radiation warning signal, an instruction to disable shifting the radiation imaging apparatus into the radiographing enabled state, and in response to the radiation-warning cancel signal, an instruction not to disable shifting the radiation imaging apparatus into the radiographing enabled state.

16. A computer-readable storage medium storing computer executable instructions for causing a computer to execute a method for controlling a radiographing system including a plurality of radiation imaging apparatuses that detect radiation and form a radiographic image, the method comprising:
   shifting, in response to a transition request from a radiation imaging apparatus to shift the radiation imaging apparatus into a radiographing enabled state, the radiation imaging apparatus into the radiographing enabled state in which radiation is detected and a radiographic image is generated;
   determining whether to disable shifting the radiation imaging apparatus into the radiographing enabled state based on control for radiographing using a different radiation imaging apparatus currently in the radiographing enabled state; and disabling shifting the radiation imaging apparatus into the radiographing enabled state based on a determination result.

17. A method for controlling a radiation imaging apparatus, the method comprising:

transmitting a transition request for shifting the radiation imaging apparatus into a radiographing enabled state;

shifting, in response to a command to shift the radiation imaging apparatus into a radiographing enabled state in which radiation is detected and a radiographic is image generated, the radiation imaging apparatus into the radiographing enabled state;

determining whether to disable the transition request based on control for radiographing using a different radiation imaging apparatus in the radiographing enabled state; and disabling transmitting of the transition request based on a determination result.

18. A computer-readable storage medium storing computer executable instructions for causing a computer to execute a method for controlling a radiation imaging apparatus, the method comprising:

transmitting a transition request for shifting the radiation imaging apparatus into a radiographing enabled state;

shifting, in response to a command to shift the radiation imaging apparatus into a radiographing enabled state in which radiation is detected and a radiographic image is generated, the radiation imaging apparatus into the radiographing enabled state;

determining whether to disable the transition request based on control for radiographing using a different radiation imaging apparatus in the radiographing enabled state; and disabling transmitting of the transition request based on a determination result.

* * * * *